(12) United States Patent
Lundstrom (10) Patent No.: US 6,999,279 B2
(45) Date of Patent: Feb. 14, 2006

(54) PERPENDICULAR PATTERNED MAGNETIC MEDIA

(75) Inventor: Garry R. Lundstrom, Forest Lake, MN (US)

(73) Assignee: Imation Corp., Oakdale, MN (US)

( * ) Notice: Subject to any disclaimer, the term of this patent is extended or adjusted under 35 U.S.C. 154(b) by 321 days.

(21) Appl. No.: 10/283,401

(22) Filed: Oct. 29, 2002

(65) Prior Publication Data

US 2004/0080847 A1 Apr. 29, 2004

(51) Int. Cl.
*G11B 5/74* (2006.01)

(52) U.S. Cl. .................. 360/131; 428/694 T (58) Field of Classification Search ............. 360/131, 360/75, 77.08, 78.14; 369/13, 54
See application file for complete search history.

(56) References Cited

U.S. PATENT DOCUMENTS

| | | | |
|---|---|---|---|
| 4,646,168 A | * | 2/1987 | Sonobe et al. ............ 360/18 |
| RE33,949 E | * | 6/1992 | Mallary et al. ............ 360/110 |
| 5,402,278 A | | 3/1995 | Morita |
| 5,537,282 A | | 7/1996 | Treves et al. |
| 5,907,448 A | | 5/1999 | Watanabe et al. |
| 5,991,104 A | | 11/1999 | Bonyhard |
| 6,139,936 A | | 10/2000 | Weiss |
| 6,168,845 B1 | | 1/2001 | Fontana, Jr. et al. |
| 6,313,969 B1 | | 11/2001 | Hattori et al. |
| 6,383,597 B1 | | 5/2002 | Fullerton et al. |
| 6,391,430 B1 | | 5/2002 | Fullerton et al. |
| 6,421,195 B1 | | 7/2002 | Rubin et al. |
| 2002/0101680 A1 | | 8/2002 | Ottesen et al. |

FOREIGN PATENT DOCUMENTS

| | | |
|---|---|---|
| JP | 07153047 | 6/1995 |
| JP | 2000306236 | 11/2000 |
| WO | WO 99/40575 | 8/1999 |
| WO | WO 02/23538 A2 | 3/2002 |

OTHER PUBLICATIONS

Ishida et al., "Discrete-Track Magnetic Disk Using Embossed Substrate," IEICE Trans. Fundamentals, vol. E76-A, No. 7, Jul. 1993.

Takeda et al, "A Study on Pre-Embossed Rigid Magnetic Disk," IEICE Trans. Electron, vol. E77-C, No. 9, Sep. 1994.

* cited by examiner

Primary Examiner—Alan T. Faber
(74) Attorney, Agent, or Firm—Eric D. Levinson (57) ABSTRACT

The invention is directed to patterned magnetic media for use in magnetic recording and data storage, and various conditioning techniques that can be used to magnetically condition the patterns. For example, a medium can be formed to exhibit a pattern of surface variations defined by patterned areas and non-patterned areas. Techniques are described for magnetically conditioning the patterned areas. The techniques may be useful for perpendicular patterned media, i.e., media having patterns formed on the media surface and having a magnetic anisotropy that is perpendicular to the plane of the medium. In particular, perpendicular magnetic anisotropy has been found to be an important factor that allows effective conditioning of patterned features having relatively small widths.

17 Claims, 9 Drawing Sheets

PERPENDICULAR PATTERNED MAGNETIC MEDIA

This invention was made with Government support under Agreement No. 70NANB1H3022 with the National Institute of Standards and Technology (NIST) Advanced Technology Program (ATP). The Government has certain rights in this invention.

TECHNICAL FIELD

The invention relates to data storage media and, more particularly, patterned magnetic media formed with surface variations.

BACKGROUND

Many types of magnetic data storage media have been developed to store information. They include magnetic hard drives, magnetic diskettes, magnetic tapes, magnetic tape cartridges, hybrid magnetic media such as magnetic-optical disks, and the like. Increasing data storage density is a paramount goal in the development of new or improved types of magnetic data storage media. Reducing production costs is another goal.

Magnetic media generally function according to ferromagnetic principles. For example, the surface of a magnetic medium may be coated with one or more magnetic layers, e.g., in the form of a multi-layered magnetic stack or a magnetic alloy. The local magnetization of magnetic domains defined on the magnetic layers can be selectively oriented to encode data. The local magnetizations can then be detected and interpreted in order to read the recorded data. A hysteresis curve typically defines how the magnetic domains can be oriented or reoriented in response to application and removal of magnetic fields.

A number of techniques have been developed to increase storage densities and improve quality and reliability of magnetic media. For example, new and improved coatings have been developed in an effort to improve quality and performance of magnetic media. In addition, patterned media have been developed in which microscopic surface variations in the form of bumps, pits, ridges, grooves, or the like, are added to the media. The surface variations may be used, e.g., for the purpose of information storage, or to provide servo patterns that can be used to identify locations on the media with improved accuracy. In both cases, the addition of surface variations may increase storage densities.

Magnetic media can also be categorized as longitudinal or perpendicular. Most conventional magnetic media are longitudinal. In longitudinal media, magnetic anisotropy lies parallel to the plane of the medium. In other words, in longitudinal media, the magnetic orientation of individual magnetic domains is generally parallel to the surface of the medium.

In perpendicular media, on the other hand, magnetic anisotropy is perpendicular to the plane of the medium. In other words, in perpendicular media, the magnetic orientation of individual magnetic domains is perpendicular to the medium surface. Perpendicular media generally allow for higher storage densities than can be achieved in longitudinal media.

SUMMARY

In general, the invention is directed to patterned magnetic media for use in magnetic recording and data storage, and various conditioning techniques that can be used to magnetically condition the patterns. For example, a medium can be formed to exhibit a pattern of surface variations defined by patterned areas and non-patterned areas. As one example, the patterned areas may comprise bumps and the non-patterned areas may comprise the regions between the bumps. According to another example, the patterned areas may comprise pits and the non-patterned areas may comprise the regions between the pits.

The bumps or pits may be used as units of information storage, e.g., in a pre-defined ROM format, or may comprise servo markings used for tracking purposes. In either case, techniques are described for magnetically conditioning the bumps, pits, or other surface variations. The techniques may be especially useful for perpendicular patterned media, i.e., media having patterns formed on the media surface and having a magnetic anisotropy that is perpendicular to the plane of the medium. In particular, perpendicular magnetic anisotropy permits effective conditioning for patterned areas that are less than approximately 5.0 microns in width.

In one embodiment, the invention provides a magnetic recording medium comprising a substrate, and a magnetic recording layer exhibiting perpendicular magnetic anisotropy formed over the substrate. The magnetic recording layer may also exhibit a pattern of surface variations defined by patterned areas and non-patterned areas, wherein the patterned areas are magnetized differently than the non-patterned areas. At least some of the patterned areas may define a width less than approximately 5.0 microns, or less than approximately 1.0 micron.

In another embodiment, the invention provides a method comprising receiving a patterned magnetic medium having perpendicular magnetic anisotropy and exhibiting a pattern of surface variations defined by patterned areas and non-patterned areas, and applying a DC magnetic field to the medium to magnetize the patterned areas differently than the non-patterned areas.

In another embodiment, the invention provides a method comprising receiving a patterned magnetic medium having perpendicular magnetic anisotropy and exhibiting a pattern of surface variations defined by patterned areas and non-patterned areas, wherein at least some of the patterned areas define a width less than approximately 5.0 microns. The method may further include applying a first DC magnetic field to the medium to similarly magnetize the patterned areas and the non-patterned areas, and applying a second DC magnetic field to the medium to magnetize the patterned areas differently than the non-patterned areas.

In other embodiments, the invention may be directed to a magnetic storage device such as a magnetic tape drive, a magnetic disk drive, a hard disk drive, a floppy disk drive, a magnetic tape cartridge drive, or the like. In any case, the magnetic storage device may include a magnetic storage medium, a head to detect magnetic domains on the medium, a controller that controls a position of the head relative to the medium, and a signal processor that interprets detected magnetic domains. The magnetic storage medium may include a substrate, a substantially continuous magnetic recording layer exhibiting perpendicular magnetic anisotropy formed over the substrate. The magnetic recording layer may exhibit a pattern of surface variations defined by patterned areas and non-patterned areas, wherein the patterned areas are magnetized differently than the non-patterned areas. The head may comprise a longitudinal read/write head even though the medium exhibits perpendicular magnetic anisotropy.

The invention may be capable of providing one or more advantages. For example, the invention may enable increased data storage densities and/or improve tracking capabilities. Moreover, the invention may improve data integrity by allowing corrupted media to be reconditioned such that data can once again be magnetically detected following corruption. Also, the invention may allow for ON/OFF magnetic switching of patterned features, as well as simple polarization reversals, if desired.

Moreover, it has been discovered that the use of a magnetic recording layer exhibiting perpendicular magnetic anisotropy enables effective conditioning to occur, as described herein, for widths (W) of patterned areas that are less than approximately 5.0 microns, and more specifically less than approximately 1.0 micron.

Additional details of these and other embodiments are set forth in the accompanying drawings and the description below. Other features, objects and advantages will become apparent from the description and drawings, and from the claims.

DETAILED DESCRIPTION

In general, the invention is directed to patterned magnetic media and conditioning techniques for the patterned magnetic media. In this disclosure, the phrase "patterned magnetic media" refers to magnetic media formed with surface variations which are used for information storage, servo tracking purposes, or the like. For example, the patterned magnetic media may be formed with patterned surface variations such as bumps, pits, ridges, rails, channels, grooves, or other types of protrusions or depressions. As used herein, conditioning refers to magnetically orienting a medium to define desired local magnetic states on the medium.

In many exemplary embodiments, the patterned media is described as perpendicular magnetic media. The phrase "perpendicular magnetic media" refers to magnetic media in which magnetic anisotropy is perpendicular to the surface of the medium. In contrast, the phrase "longitudinal magnetic media" refers to magnetic media in which magnetic anisotropy is generally parallel to the surface of the medium. Perpendicular media allows for much higher storage densities than can be achieved in longitudinal media. In accordance with the invention, a patterned, perpendicular magnetic medium is described that is conditioned for magnetic detection of the patterned features. The conditioning techniques are also described.

Figure 1:
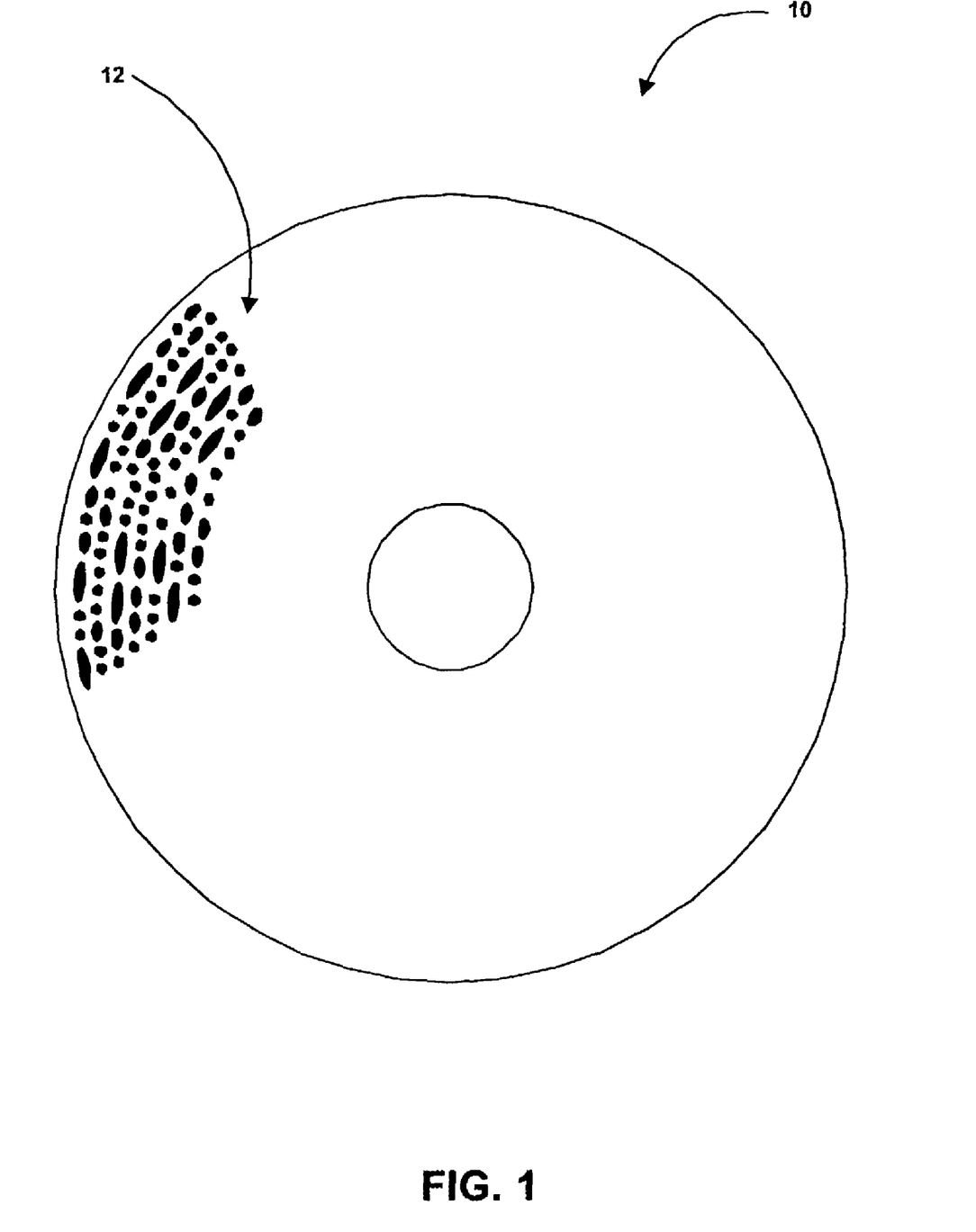
FIG. 1 is a conceptual top view of an exemplary magnetic recording medium.

FIG. 1 is a conceptual top view of an exemplary magnetic recording medium 10. Medium 10 is illustrated as a disk, but the invention is not limited in that respect. For example, medium 10 could alternatively take the form of a card-shaped medium, magnetic tape, or other media types. In any case, medium 10 is formed with a pattern of surface variations 12. For example, the pattern of surface variations 12 comprises surface bumps that protrude a small distance from the surface of medium 10. In other embodiments, however, the pattern of surface variations 12 may comprise pits, ridges, rails, channels, grooves, or other types of protrusions or depressions that protrude from or extend into the surface of medium 10.

Surface variations 12 may comprise pre-embossed features used for data storage or servo tracking purposes. For example, surface variations 12 may be embossed, etched, molded, ablated, or the like, e.g., on a polymer material that forms an underlayer of medium 12, or possibly on the substrate of medium 10. In the example of FIG. 1, surface variations 12 may be arranged as data patterns defined by bumps. In other cases, the surface variations may define servo patterns used for tracking purposes. In any case, the surface variations may provide a microscopic roughness or texture to the surface of medium 10. The different surface variations may have similar shapes to one another, or may assume different shapes, as illustrated in FIG. 1.

As mentioned, surface variations 12 may contain servo patterns for tracking purposes, and in some embodiments the surface variations may represent encoded data, e.g., in a read-only format. Regardless of content, however, the surface variations 12 may be pre-written at relatively low cost, e.g., by processes such as stamping, embossing, molding, ablation, or the like.

Mechanically formed surface variations 12 may be sized smaller than conventional magnetic domains, and thus may provide the ability to achieve higher storage densities on medium 10 than can be achieved with conventional magnetic media that does not include surface variations. For example, in some cases, individual surface variations may have at least one lateral dimension less than one micron. If surface variations 12 are depressions, such as pits or grooves, the variations may be 20 nm to 150 nm deep. If surface variations 12 project from medium 10, they may project a height less than a fly height (in the case of flyable media), ensuring that medium 10 maintains a flyable surface by avoiding head-to-medium collisions.

In one specific embodiment, surface variations 12 include a plurality of oval shaped bumps, some having a surface area less than 40,000 square nanometers. Again, these data bumps may project from medium 10 to a height less than the fly height, e.g., in the case of flyable media. For instance, a medium designed to fly at a height of 25 nm may have bumps that project from the medium to a height less than 20 nm. Bumps of this size may allow significant areal density of read-only data (>1 Gigabit/cm$^2$) while still ensuring that the medium maintains a flyable surface for a read head.

As outlined in greater detail below, patterned areas of medium 12 can be magnetized differently than non-patterned areas of medium 10. In other words, surface variations 12 can be magnetized differently than the areas between the respective surface variations 12. As used herein, the term patterned areas refers to areas corresponding to topographical features such as bumps, pits, ridges, rails, channels, grooves, or other types of protrusions or depressions. The term non-patterned areas refer to the generally flat and co-planer regions between the patterned areas.

Magnetic conditioning can improve the detectability of surface variations, e.g., allowing a magnetic head to magnetically detect the presence or absence of individual surface variations with greater ease. Accordingly, format information or data may be encoded in medium 10 by the creation of surface variations 12, and then conditioned for magnetic detection. In some cases, the magnetic conditioning of surface variations 12 can be used to effectively turn the pattern ON or OFF magnetically. Also, if medium 10 becomes demagnetized, data recovery can be performed by reconditioning surface variations 12 for magnetic detection.

Figure 2:
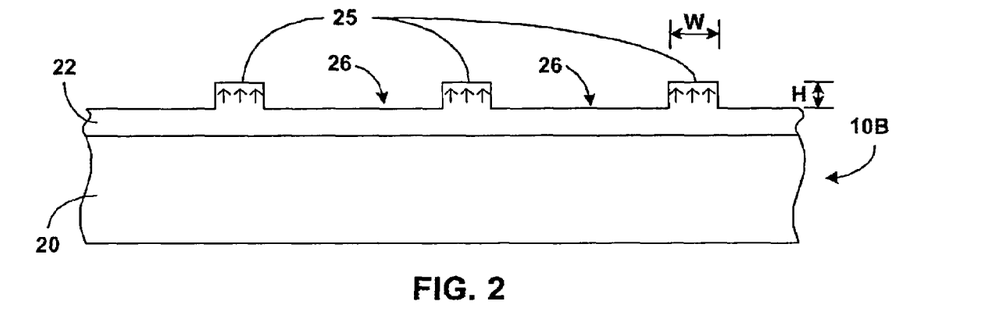
FIGS. 2–8 are conceptual enlarged cross-sectional side views of an exemplary magnetic recording media according to embodiments of the invention.

FIG. 2 is a conceptual enlarged cross-sectional side view of an exemplary magnetic recording medium 10B according to an embodiment of the invention. As shown, magnetic recording medium 10B includes a substrate 20, and a magnetic recording layer 22 formed over substrate 10. Additional layers may optionally be added between substrate 20 and a magnetic recording layer 22 such as seed layers to facilitate growth of recording layer 22 or a polymer layer used to define patterned areas 25 in recording layer 22. Also, additional layers may be added over magnetic recording layer 22, such as a lube layer or hard coat. In any case, magnetic recording layer 22 exhibits a pattern of surface variations defined by patterned areas 25 and non-patterned areas 26. Again, as used here, the term patterned areas refers specifically to topographical features, and the term non-patterned areas refers to the regions between the topographical features. Accordingly, the non-patterned areas generally define a flat coplanar surface, and the patterned areas define depressions or protrusion from the non-patterned areas.

Substrate 20 may comprise glass, plastic, organic resin, metal, or any other suitable substrate material. Plastic is a particularly attractive substrate material because of its low cost and ease of production. Moreover, plastic substrates may be embossed with surface variations, e.g., during an injection molding process.

In general, magnetic recording layer 22 comprises a substantially continuous layer that includes at least one magnetic material to facilitate magnetic recording. In some cases, magnetic recording layer 22 comprises a magnetic alloy formed of a number of materials. In other cases, magnetic recording layer 22 may include a number of sub-layers, e.g., arranged as a multi-layered magnetic stack. Magnetic recording layer 22 is typically formed by a deposition process in which the material or materials of recording layer 22 are sputtered onto substrate 20, or sputtered onto one or more other layers formed over substrate 20 prior to the deposition of recording layer 22. In accordance with the invention, etching or selective removal of portions of magnetic recording layer to magnetically distinguish the patterned areas 25 from non-patterned areas 26 may be avoided, in favor of conditioning techniques described herein. Accordingly, magnetic recording layer 22 may be a substantially continuous layer that does not include areas having the recording material selectively removed.

Magnetic recoding layer 22 may comprise a perpendicular recording layer in which the magnetic anisotropy of layer 22 is perpendicular to the plane of medium 10B. In other words, the magnetic orientation of individual magnetic domains is perpendicular to the medium surface. Perpendicular media generally allow for a much higher storage density than can be achieved in longitudinal media. Copending and commonly assigned U.S. application Ser. No. 10/123,957, filed Apr. 17, 2002 for Sexton, bearing docket number 10326US01 and entitled "Perpendicular Magnetic Recording Media," and U.S. application Ser. No. 10/146,269, filed May 15, 2002 for Sexton bearing docket number 10334US01 and entitled "Perpendicular Magnetic Recording Media With An Amorphous Underlayer" describe some exemplary perpendicular recording layers that may be used in accordance with this invention, and are hereby incorporated by reference in their entireties. Other magnetic recording materials or perpendicular magnetic recording layers, however, may also be used, such as layers including CoCrPt alloys or CoCr alloys.

As outlined in greater detail below, patterned areas 25 are magnetized differently than the non-patterned areas 26 via conditioning techniques that enable the ability to magnetically detect patterned areas 25 using conventional longitudinal read heads. For example, a DC magnetic field selected to have the appropriate field strength can be used to magnetize patterned areas 25 substantially the same (as indicated by the similar perpendicular orientation of the arrows) without substantially affecting the magnetization of non-patterned areas 26. Once the perpendicular domains of patterned areas 25 are magnetized substantially the same, albeit differently than non-patterned areas 26, a conventional longitudinal read head can be used to detect individual features of patterned areas 25. In this manner, the ability to magnetically detect the individual features of patterned areas storing data, tracking information, or the like, can be improved.

In accordance with the invention, at least some of patterned areas 25 may have a width (W) less than approximately 5.0 microns, and, more preferably, less than approximately 1.0 micron. In that case, the height (H) of patterned areas (or depth if depressions are used rather than protrusions) may be in the range of 5–100 nm, and more preferably approximately 20–50 nanometers. In particular, it has been determined that the use of a magnetic recording layer 22 exhibiting perpendicular magnetic anisotropy is a feature that enables effective conditioning to occur, as described herein, specifically when the widths W of patterned areas are less than approximately 5.0 microns, and more specifically less than approximately 1.0 micron.

Figure 3:
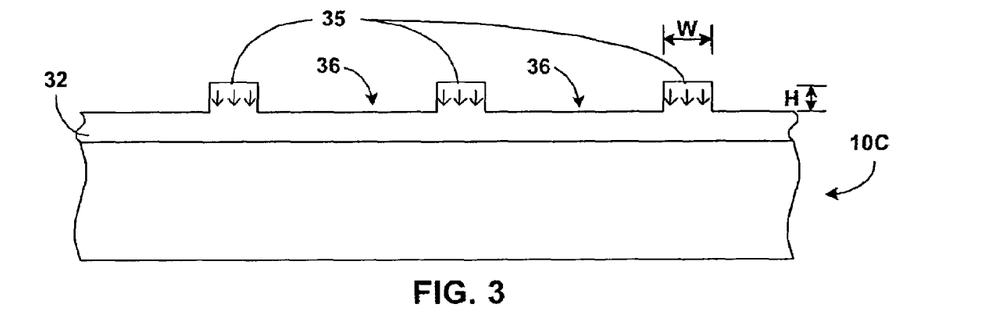

FIG. 3 illustrates a slight variation of the magnetic medium of FIG. 2. As shown in FIG. 3, medium 10C includes magnetic recording layer 32 defining patterned areas 35 that are magnetized substantially the same, albeit differently than non-patterned areas 36. However, the polarization of the magnetization of patterned areas 35 is reversed relative to patterned areas 25 illustrated in FIG. 2. One advantage of the conditioning techniques described herein is the ability to easily perform such a polarization reversal as described in greater detail below. Again, at least some of patterned areas 35 may have a width (W) less than approximately 5.0 microns, and more preferably, less than approximately 1.0 micron, and a height (H) or depth in the range of approximately 5–100 nm. Heights or depths larger than a fly height may cause risk of head crashes, while depths or heights that are too small may cause difficulty in conditioning because of inadequate head to medium spatial differences at patterned areas relative to non-patterned areas.

Figure 4:
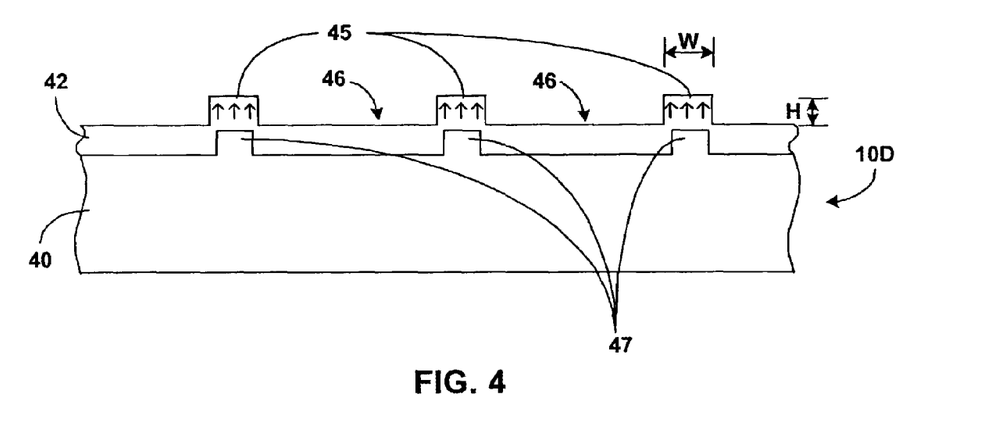

FIG. 4 is a conceptual enlarged cross-sectional side view of an exemplary magnetic recording medium 10D illustrating one exemplary method for forming patterned areas 45. In this case, patterned areas 45 are formed by replicating features 47 into substrate 40. For example, features 47 may be defined during a mastering and stamping process in which a stamper is created from a master and then used in an injection molding process to injection mold substrate 40 to exhibit features 47. Alternatively, features 47 may be etched, embossed, ablated, or the like, into substrate 40 after substrate is molded. In any case, a substantially continuous magnetic recording layer 42 can be deposited over substrate such that recording layer 42 substantially conforms to features 47. In this manner, patterned areas 45 can be defined by features 47 formed in substrate 40. Moreover, at least some of patterned areas 45 may have a width (W) less than approximately 5.0 microns, and more preferably, less than approximately 1.0 micron, and a height (H) or depth in the range of approximately 5–100 nm.

Alternatively, an additional layer may be added over a substantially flat substrate prior to the deposition of the recording layer. In that case, the additional layer may be replicated, ablated, embossed, or the like, to form features similar to features 47 (FIG. 4). In still other cases, patterned areas may be formed directly in a substantially continuous recording layer, such as via a calendaring process using an embossing calendar drum that replicates such features directly into the recording material. In short, the invention is generally not limited to the methods or manner in which patterned areas and non-patterned areas are formed in the recording layer. Rather, a wide variety of techniques may be used to define the patterned areas, including replication, embossing, ablation, calendaring, or the like.

FIGS. 5–8 are conceptual cross-sectional views of exemplary data storage media according to embodiments of the invention. In each case, at least some of patterned areas 55, 65, 75, 85 may have a width (W) less than approximately 5.0 microns, and more preferably, less than approximately 1.0 micron. In addition, patterned areas may define heights (H) or depths in the range of 5–100 nm.

Figure 5:
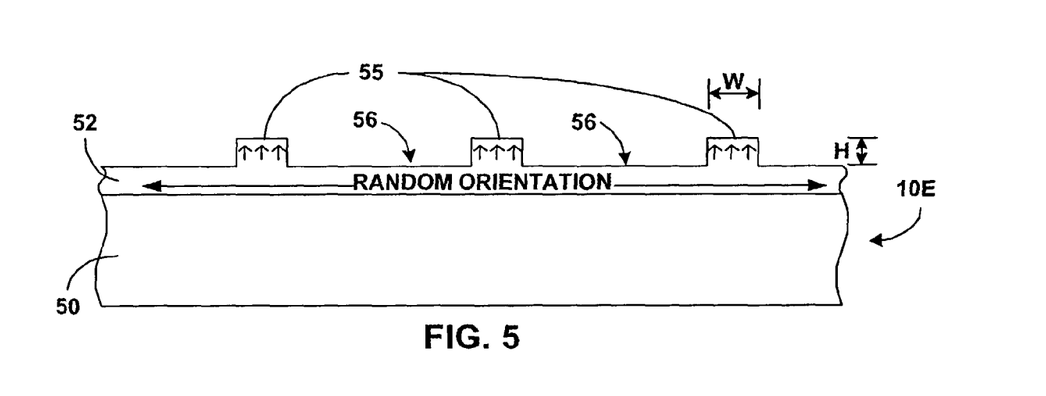

As illustrated in FIG. 5, medium 10E includes a substrate 50 and a substantially continuous magnetic recording layer 52 formed over the substrate. Recording layer 52 exhibits perpendicular magnetic anisotropy and is formed to include a pattern of surface variations defining patterned areas 55 and non-patterned areas 56. The patterned areas 55 can be magnetized substantially the same, and the non-patterned areas 56 may be substantially unmagnetized, in that the magnetic domains exhibit substantially random orientations.

Figure 6:
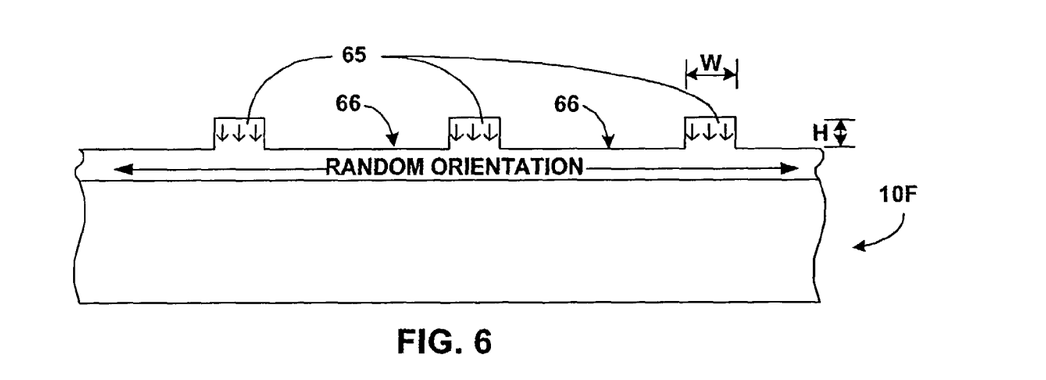

FIG. 6 illustrates medium 10F that is similar to medium 10E of FIG. 5. However, the polarization of the magnetization of patterned areas 65 are reversed relative to patterned areas 55 illustrated in FIG. 5. As mentioned above, one advantage of the conditioning techniques described herein is the ability to easily perform such a polarization reversal. For example, after orienting the patterned areas in a first direction using a first DC pass of a head over the medium as described below, a second DC pass of opposite polarity can be performed to orient the patterned areas opposite the first orientation. Alternatively, an erase pass followed by a write pass of the head may be used to condition the medium as outlined below. In that case, in order to achieve polarization reversal, a first erase pass and a first write pass to orient the patterned areas, and a second erase pass and a second write pass may reorient the patterned areas in a reversed fashion.

In still other embodiments, the patterned areas may be unmagnetized and the non-patterned areas may be magnetized with substantially the same polarization. Such a configuration may be particularly useful if pits are used as the surface variations rather than bumps as illustrated in FIGS. 5 and 6.

Figure 7:
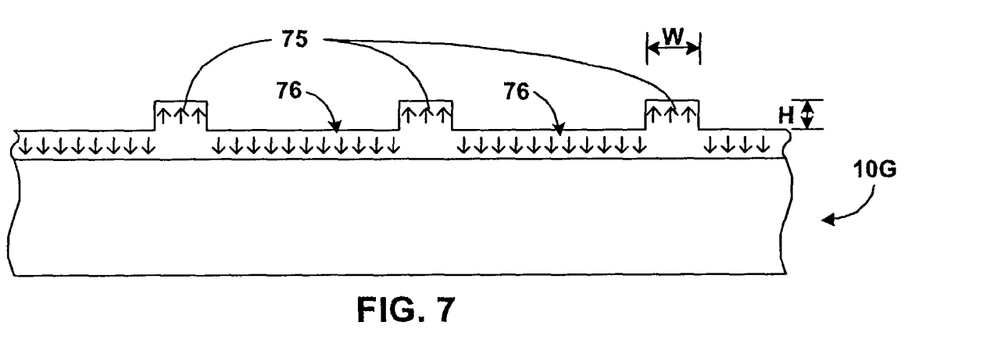
Figure 8:
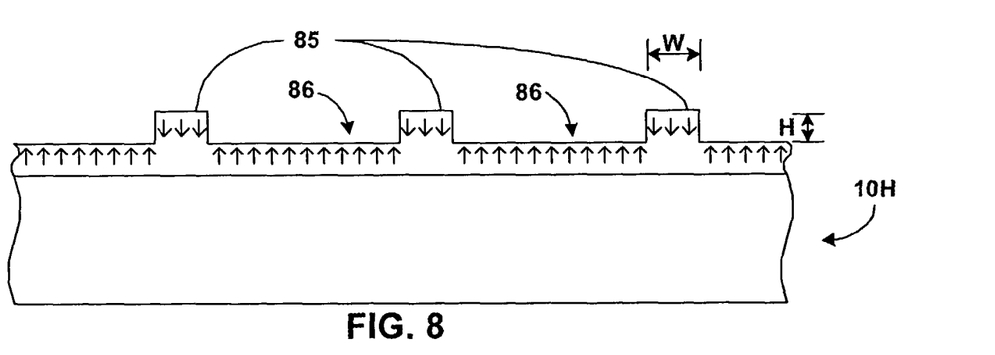

FIGS. 7 and 8 illustrate media 10G and 10H, respectively, in which patterned areas 75, 85 are magnetized in one polarization and non-patterned areas 76, 86 are magnetized in the opposite polarization. Such opposing polarizations in the patterned areas 75, 85 relative to the respective non-patterned areas 76, 86 can even further enhance the ability to magnetically detect individual patterned features. In order to create media 10G or 10H as illustrated in FIGS. 7 and 8, an additional conditioning step can be performed as outlined in greater detail below.

Figure 9:
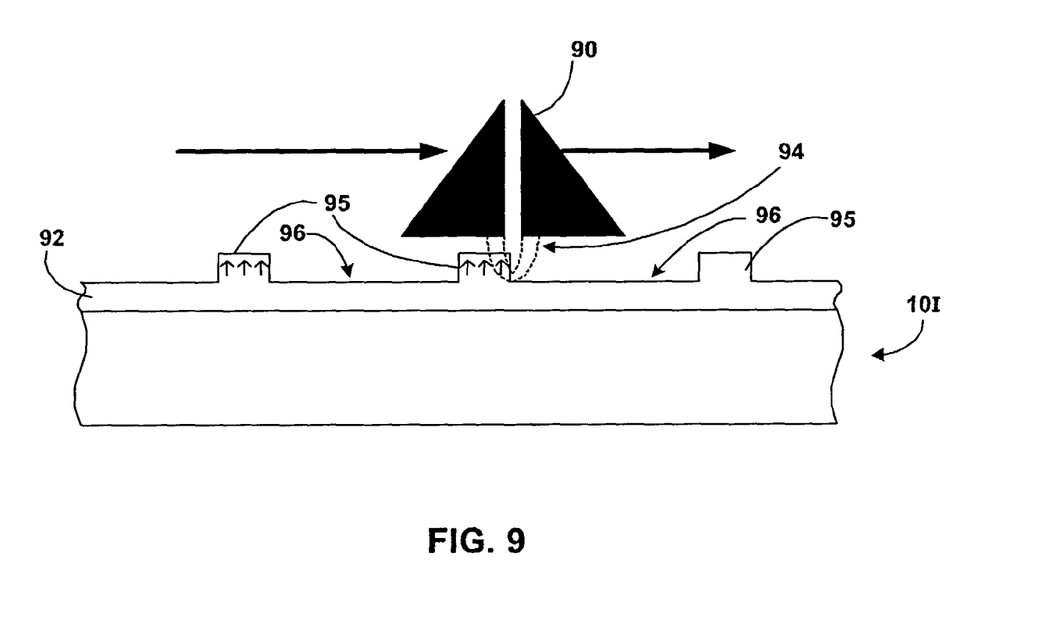
FIG. 9 is a conceptual cross-sectional view of an exemplary data storage medium being conditioned by a read/write head in accordance with an embodiment of the invention.

FIG. 9 is a conceptual cross-sectional view of exemplary data storage medium 10I being conditioned by a read/write head 90 in accordance with an embodiment of the invention. As shown, head 90 passes over medium 10I, applying a DC magnetic field 94 to the surface of medium 10I. In other words, an electrical direct current (DC) is applied to head 90 causing the head to produce a non-oscillating field 94. In particular, the strength of DC magnetic field 94 is strong enough to magnetize patterned areas 95, but too weak to substantially magnetize non-patterned areas 96. The conditioning pass of head 90 (as illustrated by the lateral arrows) conditions patterned areas 95 such that patterned areas 95 are magnetized substantially the same and differently from non-patterned areas 96. The same concept, however, may be applied to surface variations in the form of pits in which the DC magnetic field is strong enough to magnetize non-patterned areas, but too weak to magnetize patterned areas.

In accordance with the invention, magnetic recording layer 92 may exhibit perpendicular magnetic anisotropy. Moreover, head 90 may comprise a conventional longitudinal read/write head, such as the Seagate Apollo Certifier Head, commercially available from Seagate Technology of Scotts Valley Calif., U.S.A. While such conventional longitudinal read/write heads may be less effective in conditioning patterned longitudinal media having feature sizes less than approximately 5 microns, surprisingly, they are very effective in conditioning such media exhibiting perpendicular magnetic anisotropy. In particular, head 90 can be used to apply an appropriately selected DC magnetic field sufficient to magnetize patterned areas 95, but insufficient to magnetize non-patterned areas 96 (or vice versa). Selective magnetization of the patterned areas vs. non-patterned areas may occur because of the different magnetic flux intensities associated with the slight changes in head to medium spacing caused by the existence or absence of a patterned feature directly below head 90 at any given instance.

The DC magnetic field needed to selectively magnetize non-patterned areas 96, or in the case of pits, to selectively magnetize non-patterned areas, may depend on the composition of recording layer 92, as well as the distance from head 90 to medium. In one example, effective conditioning occurred by applying approximately a 15 mA current (or −15 mA current) to head 90 and passing head 90 over medium 10I at a head-to-medium spacing of less than approximately 25 nanometers. In that case, the head 90 may move over medium 10I at a speed in a range of 1800–15000 revolutions per minute (RPM), such as a speed of approximately 3600 RPM or greater.

Figure 10A:
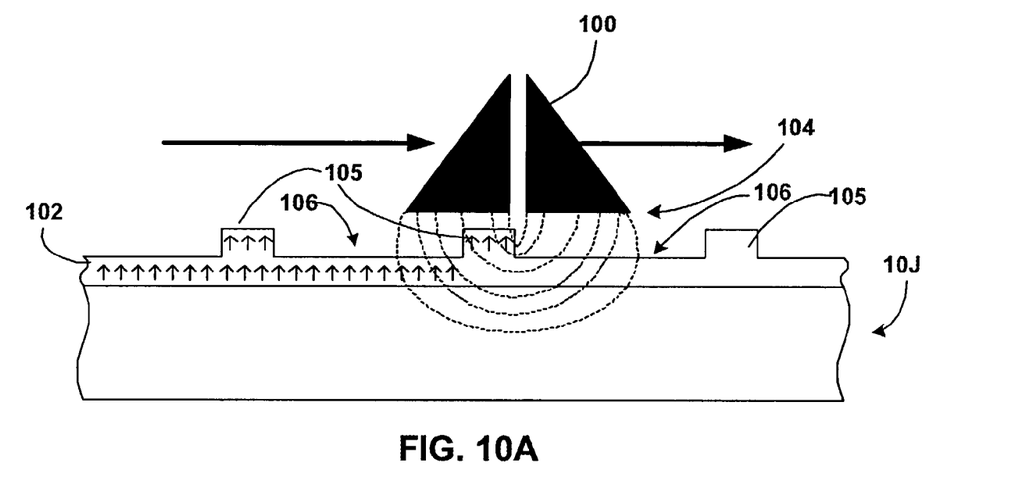
FIGS. 10A and 10B are additional conceptual cross-sectional views of an exemplary data storage medium being conditioned by a read/write head in accordance with another embodiment of the invention.
Figure 10B:
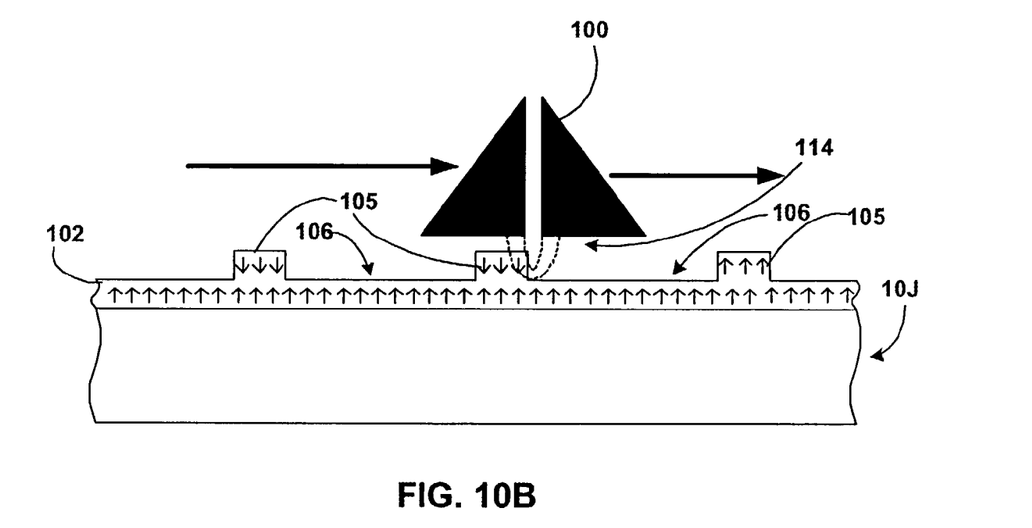

FIGS. 10A and 10B are additional conceptual cross-sectional views of exemplary data storage medium 10J being conditioned by a read/write head 100 in accordance with an embodiment of the invention. In this example, head 100 makes at least two passes over medium 10J, applying a relatively strong DC magnetic field 104 to the surface of medium 10J to polarize both the patterned and non-patterned regions of recording layer, and then applying a weaker DC magnetic field 114 that is strong enough to magnetize patterned areas to an opposite polarity, but too weak to magnetize non-patterned areas to that opposite polarity. Again, the same concept may be applied to surface variations in the form of pits in which the weak DC magnetic field 114 is strong enough to magnetize non-patterned areas, but too weak to magnetize patterned areas.

The first pass of head 100 (illustrated in FIG. 10A) can be viewed as an erase pass that erases all selective magnetizations and orients the perpendicular domains of layer 102 in a common orientation. The second pass of head 100 (illustrated in FIG. 10B) can be viewed as a write pass that magnetizes only the patterned areas 105 (or only the non-patterned areas if pits are used rather than bumps as illustrated). In either case, the first pass commonly orients layer 102, and the second pass magnetically distinguishes patterned areas 105 of layer 102 from non-patterned areas 106.

Like the example of FIG. 9, in the example of FIGS. 10A and 10B, the applied DC magnetic fields can be selected for proper conditioning to occur. For example, during the erase pass illustrated in FIG. 10A, field 104 may be created by applying approximately a 50 mA current (or −50 mA current) to head 90 and passing head 90 over medium 10J at a head-to-medium spacing of approximately less than approximately 25 nanometers, and a head speed of approximately 3600 RPM. During the write pass illustrated in FIG. 10B, field 114 may be created by applying approximately a −15 mA current (or 15 mA current) to head 90 and passing head 90 over medium 10J at a read-to-medium spacing of less than approximately 25 nanometers and a head speed of approximately 3600 RPM. Importantly, if the erase pass (FIG. 10A) uses a positive current, then the write pass (FIG. 10B) should use a negative current. Likewise, if the erase pass (FIG. 10A) uses a negative current, then the write pass (FIG. 10B) should use a positive current. In either case, the use of an erase pass, followed by a write pass may improve performance of medium 10J in terms of the read-back signal strength and ability to detect the magnetically enabled surface patterns.

Alternatively, a bulk erase process could also be used instead of an erase pass. In other words, the same effect of the erase pass may be achieved by subjecting the medium to a large magnetic field that commonly orients all the magnetic domains of the medium.

The techniques described herein can realize several other advantages, including the ability to easily reverse the polarization of patterned areas relative to non-patterned areas, or vice versa. In addition, the techniques may be used to magnetically turn surface patterns ON or OFF by respectively performing a write pass or an erase pass. For example, the selective magnetic ON/OFF switching of patterned areas may be used for security purposes. In addition, if data is stored in the form of surface variations, the write pass, or an erase pass followed by a write pass, may be used to recondition media, e.g., following corruption or demagnetization of the media. Accordingly, the techniques described herein may improve the integrity of stored data in the sense that corruption of a medium can be easily corrected by effective reconditioning.

Moreover, in accordance with the invention, at least some of the patterned areas may have a width (W) less than approximately 5.0 microns and, more preferably, less than approximately 1.0 micron. The height (H) of patterned areas (or depth if depressions are used rather than protrusions) may be in the range of 5–100 nm. In particular, it has been determined that the use of a magnetic recording layer exhibiting perpendicular magnetic anisotropy is a feature that enables effective conditioning to occur, as described herein, specifically when the widths W of patterned areas are less than approximately 5.0 microns, and more specifically less than approximately 1.0 micron. At these sizes, the conditioning techniques described herein may be less effective if longitudinal recording layers were used. Accordingly, the use of a recording layer exhibiting perpendicular magnetic anisotropy is a useful feature to facilitate conditioning, as described herein, specifically when the media has patterned features of widths less than approximately 5.0 microns, and more specifically less than approximately 1.0 micron.

Figure 11:
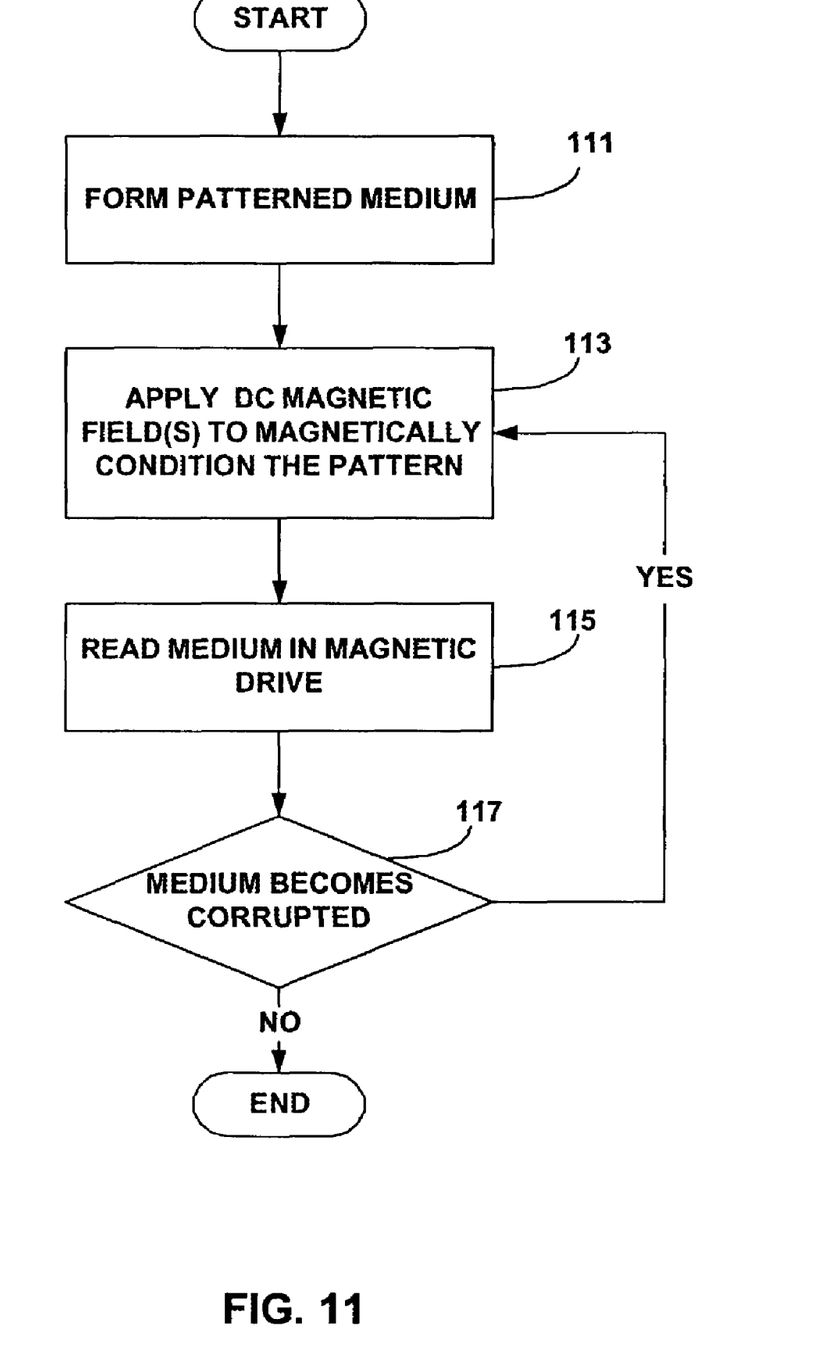
FIG. 11 is a flow diagram according to an embodiment of the invention.

FIG. 11 is a flow diagram illustrating a conditioning technique according to an embodiment of the invention. As illustrated, a patterned medium is formed (111), such as by replicating a pattern of surface variations in a substrate or a layer formed over the substrate, and then depositing a magnetic recording layer so that it substantially conforms to the surface variations. Alternatively, the patterned medium can be formed by etching, embossing, calendaring, or the like. In any case, the patterned areas may have widths less than approximately 5.0 microns, and more specifically less than approximately 1.0 micron. The deposited magnetic recording layer may exhibit perpendicular magnetic anisotropy to ensure that conditioning of the patterned areas will be effective.

Once the medium is formed, it can be conditioned by applying DC magnetic field(s) to the medium (113). For example, a single write pass with the read head may be performed as illustrated in FIG. 9, or more preferably, an erase pass followed by a write pass of the head may be performed as illustrated in FIG. 10. In either case, appropriately selected DC magnetic fields can cause the magnetic orientation of patterned areas to differ from the orientation of the non-patterned areas. Moreover, this orientation is generally perpendicular to the surface of the medium, which allows effective conditioning to occur even when widths associated with the patterned features are less than approximately 5.0 microns, or less than approximately 1.0 micron.

Once conditioned, the medium can be read in a magnetic drive (115) because the conditioning magnetically distinguishes the patterned areas from the non-patterned areas. Moreover, if the medium later becomes corrupted, e.g., by demagnetization, (yes branch of 117), conditioning can be performed again to uncorrupt the medium (113). Specifically, the bumps or pits can be conditioned, following corruption, to restore the desirable magnetic orientations of the pattern. In some cases, the magnetic drive can be programmed to perform a conditioning algorithm in response to detection of corruption. In any case, the invention may provide improved data integrity by allowing a corrupted medium to be reconditioned in a simple and effective manner.

Another advantage of the techniques described herein is that they allow for polarization reversal. In other words, the magnetization of the patterned areas relative to the non-patterned areas can be reversed. For example, if a DC magnetic field of 15 mA is applied to condition the patterned areas, the magnetization can be reversed by applying a −15 mA field. Alternatively, if the medium is conditioned by performing an erase pass at 50 mA and a write pass at −15 mA, the magnetizations can be reversed by later performing an erase pass at −50 mA, and a write pass at 15 mA. In this manner, the polarization of the patterned features of medium can be easily reversed.

Figure 12:
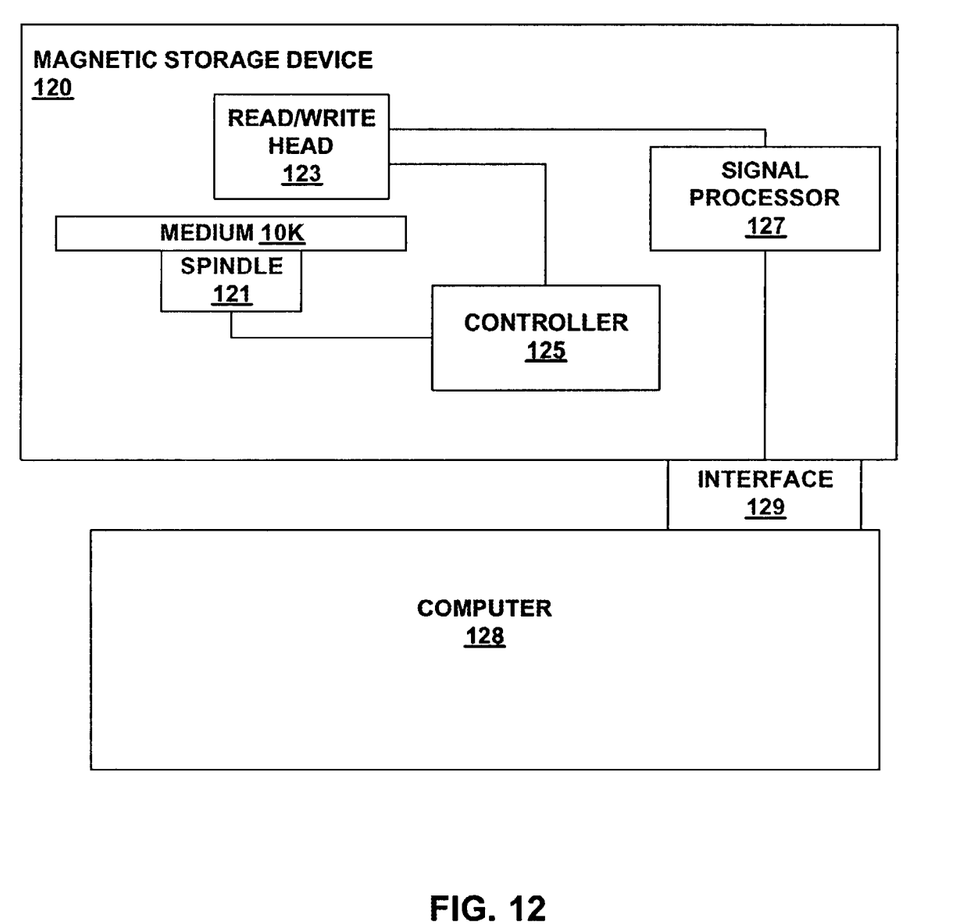
FIGS. 12 and 13 are block diagrams of exemplary magnetic storage devices that may be used to read or record data on media described herein.
Figure 13:
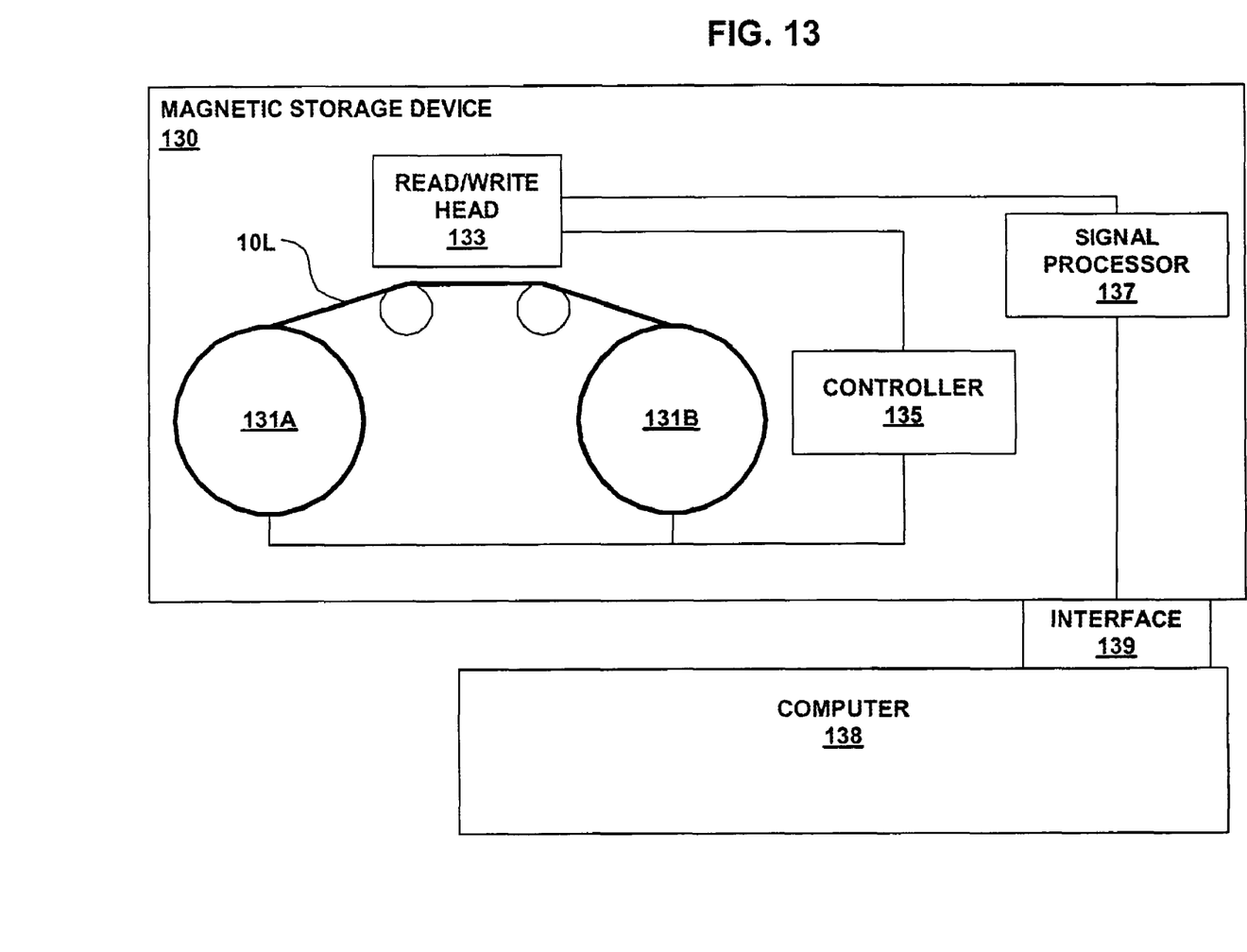

FIGS. 12 and 13 are block diagrams of exemplary magnetic storage devices that may be used to read or record data on media described herein. As shown in FIG. 12, magnetic storage device 120 may be used with a disk shaped medium 10K. In that case, magnetic storage device 120 may comprise a magnetic disk drive, a hard disk drive, a floppy disk drive, or the like. The magnetic storage medium 10K may include a substrate and a substantially continuous magnetic recording layer exhibiting perpendicular magnetic anisotropy formed over the substrate to exhibit a pattern of surface variations defined by patterned areas and non-patterned areas. Moreover, the patterned areas can be magnetized differently than the non-patterned areas as described herein, even if patterned areas define widths less than approximately 5.0 microns or less than approximately 1.0 micron.

Spindle 121 may be used to spin medium 10K and read/write head 123 may be positioned to detect magnetic domains on medium 10K. A controller 125 controls spindle 121 and read/write head 123 to precisely position read/write head 123 relative to medium 10K. A signal processor 127 interprets detected magnetic domains. In some cases, controller 125 causes read/write head 123 to perform the conditioning of medium 10K as described herein.

Magnetic storage device 120 may be coupled to a computer 128 via an interface 129. For example, computer 128 may comprise a central processing unit for any of a variety of computer devices, including, for example, a PC, a Macintosh, a computer workstation, a hand-held data terminal, a palm computer, a cell phone, digital paper, a digital television, a wireless device (in which case interface 129 may be wireless), a personal digital assistant, a laptop computer, a desktop computer, a digital camera, a digital recording device, or the like.

As shown in FIG. 13, magnetic storage device 130 may be used with a medium 10L that includes magnetic tape. In that case, magnetic storage device 130 may comprise a magnetic tape drive, a magnetic tape cartridge drive, or the like. Medium 10L may include magnetic tape spooled onto one or more spools 131A and 131B. Spools 131 may be housed in a cartridge, although the invention is not limited in that respect. The magnetic storage medium 10L in the form of magnetic tape may include a substrate, and a substantially continuous magnetic recording layer exhibiting perpendicular magnetic anisotropy formed over the substrate to exhibit a pattern of surface variations defined by patterned areas and non-patterned areas. Moreover, the patterned areas can be magnetized differently than the non-patterned areas as described herein, even if patterned areas define widths less than approximately 5.0 microns or less than approximately 1.0 micron.

Read/write head 133 may be positioned to detect magnetic domains on medium 10L. A controller 135 controls the positioning of read/write head 133 as well as the movement of medium 10L such as by turning spools 133A and/or 133B to precisely position read/write head 133 relative to medium 10L. A signal processor 137 interprets detected magnetic domains. In some cases, controller 135 causes read/write head 133 to perform the conditioning of medium 10L as described herein.

Like in FIG. 12, magnetic storage device 130 of FIG. 13 may be coupled to a computer 138 via an interface 139. Again, computer 138 may comprise a central processing unit for any of a variety of computer devices, including, for example, a PC, a Macintosh, a computer workstation, a hand-held data terminal, a palm computer, a cell phone, digital paper, a digital television, a wireless device, a personal digital assistant, a laptop computer, a desktop computer, a digital camera, a digital recording device, or the like.

The invention may be capable of providing a number of advantages. In particular, perpendicular magnetic media according to the invention may achieve higher storage densities than conventional longitudinal media. The use of a magnetic recording layer exhibiting perpendicular magnetic anisotropy is a feature that enables effective conditioning to occur, as described herein, specifically when the widths W of patterned areas are less than approximately 5.0 microns, and more specifically less than approximately 1.0 micron. At these sizes, the conditioning techniques may be less effective, or possibly ineffective, when longitudinal recording layers are used. Accordingly, the use of a recording layer exhibiting perpendicular magnetic anisotropy is a useful feature to facilitate conditioning, as described herein, specifically when the media has patterned features of widths less than approximately 5.0 microns, and more specifically less than approximately 1.0 micron.

These and other embodiments are within the scope of the following claims.

What is claimed is:

1. A magnetic recording medium comprising:
   a substrate; and
   a magnetic recording layer exhibiting perpendicular magnetic anisotropy formed over the substrate, the magnetic recording layer including a pattern of surface variations defined by patterned areas and non-patterned areas, wherein the patterned areas are magnetized differently than the non-patterned areas, wherein at least some of the patterned areas define a width of less than approximately 5.0 microns.

2. The magnetic recording medium of claim 1, wherein at least some of the patterned areas define a width of less than approximately 1.0 micron.

3. The magnetic recording medium of claim 1, wherein the patterned areas comprise bumps.

4. The magnetic recording medium of claim 3, wherein the non-patterned areas comprise regions between the bumps.

5. The magnetic recording medium of claim 1, wherein the patterned areas are magnetized with a polarity that is opposite a polarity of the non-patterned areas.

6. The magnetic recording medium of claim 1, wherein the magnetic recording layer is a substantially continuous magnetic recording layer formed over the substrate.

7. A magnetic recording medium comprising:
   a substrate; and
   a magnetic recording layer exhibiting perpendicular magnetic anisotropy formed over the substrate, the magnetic recording layer including a pattern of surface variations defined by patterned areas and non-patterned areas, wherein the patterned areas are magnetized differently than the non-patterned areas, wherein the patterned areas comprise features selected from the group consisting of: bumps, pits, ridges, rails, channels, and grooves.

8. The magnetic recording medium of claim 1, further comprising a layer formed between the substrate and the magnetic recording layer.

9. The magnetic recording medium of claim 8, wherein the layer formed between the substrate and the magnetic recording layer defines the pattern of surface variations, and wherein the magnetic recording layer substantially conforms to the pattern of surface variations.

10. The magnetic recording medium of claim 1, wherein the magnetic recording layer includes a number of sub-layers.

11. The magnetic recording medium of claim 1, wherein the patterned areas define servo patterns for the medium.

12. The magnetic recording medium of claim 1, wherein the patterned areas define stored information.

13. The magnetic recording medium of claim 1, wherein the patterned areas are all magnetized substantially the same.

14. A magnetic recording medium comprising:
a substrate; and
a magnetic recording layer exhibiting perpendicular magnetic anisotropy formed over the substrate, the magnetic recording layer including a pattern of surface variation defined by patterned areas and non-patterned areas, wherein the patterned areas are magnetized differently than the non-patterned areas, wherein the patterned areas are all magnetized substantially the same and the non-patterned areas are randomly magnetized.

15. A magnetic recording medium comprising:
a substrate; and
a substantially continuous magnetic recording layer exhibiting perpendicular magnetic anisotropy formed over the substrate, the magnetic recording layer having a pattern of surface variations defined by patterned areas and non-patterned areas, wherein the patterned areas are magnetized with a polarity that is opposite a polarity of the non-patterned areas, and wherein at least some of the patterned areas define a width less than approximately 5.0 microns.

16. The magnetic recording medium of claim 15, wherein the patterned areas are all magnetized substantially the same and the non-patterned areas are all magnetized substantially the same.

17. A perpendicular magnetic recording medium comprising a pattern of surface variations defined by patterned areas and non-patterned areas, the patterned areas being magnetized differently than the non-patterned areas, wherein the patterned areas are magnetized with a first polarity, and the non-patterned areas are magnetized with a second polarity, the second polarity being opposite the first polarity.

* * * * *